(12) United States Patent
Ketels et al.

(10) Patent No.: US 10,377,278 B2
(45) Date of Patent: Aug. 13, 2019

(54) OCCUPANT SUPPORT

(71) Applicant: Faurecia Automotive Seating, LLC, Auburn Hills, MI (US)

(72) Inventors: Cedric Ketels, Holland, MI (US); Tristan J. Vanfossen, Belmont, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 15/813,345

(22) Filed: Nov. 15, 2017

(65) Prior Publication Data

US 2018/0134195 A1  May 17, 2018

Related U.S. Application Data

(60) Provisional application No. 62/422,213, filed on Nov. 15, 2016.

(51) Int. Cl.
| | |
|---|---|
| *B60N 2/60* | (2006.01) |
| *B60N 2/66* | (2006.01) |
| *B60N 2/56* | (2006.01) |

(52) U.S. Cl.
CPC .............. *B60N 2/667* (2015.04); *B60N 2/56* (2013.01)

(58) Field of Classification Search
CPC ................................. B60N 2/667; B60N 2/56
USPC .......... 297/180.1, 284.1–284.2, 284.4–284.8
See application file for complete search history.

(56) References Cited

U.S. PATENT DOCUMENTS

| | | | |
|---|---|---|---|
| 7,905,547 B2 * | 3/2011 | Lawall | B60N 2/0224 297/284.1 |
| 8,038,215 B2 | 10/2011 | Di Giusto | |
| 8,998,320 B2 | 4/2015 | Mankame | |
| 9,056,570 B2 * | 6/2015 | Laib | B60N 2/5642 |
| 2009/0224587 A1 * | 9/2009 | Lawall | B60N 2/0224 297/353 |
| 2012/0267928 A1 * | 10/2012 | Mankame | B60N 2/002 297/284.4 |
| 2014/0239677 A1 * | 8/2014 | Laib | B60N 2/5642 297/180.1 |

FOREIGN PATENT DOCUMENTS

WO   2009114457   9/2009

* cited by examiner

*Primary Examiner* — Mark R Wendell
(74) *Attorney, Agent, or Firm* — Barnes & Thornburg LLP (57) ABSTRACT

A vehicle seat includes a seat bottom and a seat back. The seat back is coupled to the seat bottom to move relative to the vehicle seat. The vehicle further includes a support mechanism coupled to the vehicle and configured to vary support provided to an occupant sitting on the vehicle seat.

15 Claims, 8 Drawing Sheets

OCCUPANT SUPPORT

PRIORITY CLAIM

This application claims priority under 35 U.S.C. § 119(e) to U.S. Provisional Application Ser. No. 62/422,213, filed Nov. 15, 2016, which is expressly incorporated by reference herein.

BACKGROUND

The present disclosure relates to a seat, and particularly to a vehicle seat. More particularly, the present disclosure relates to a vehicle seat which is movable provide variable support to an occupant resting on the vehicle seat.

SUMMARY

According to the present disclosure, an occupant support includes a vehicle seat mounted to a floor of the vehicle. The vehicle seat includes a seat bottom and a seat back coupled to the seat bottom.

In illustrative embodiments, the occupant support further includes a lumbar support system coupled to the vehicle seat. The lumbar support system may be specific to the lumbar region or may more generally be a support the entire back region of an occupant. The lumbar or back support system is configured to provide means for varying support provided to an occupant and providing massage. The lumbar support system may be made of plastic or any other lightweight material and includes a variety of possible configurations that enable an outer surface of the seat back to move away from an initial position.

In illustrative embodiments, the lumbar support system includes a seat structure made of one or more active materials and an actuation system that activates the movement of the structure when subjected to specific thermal conditions. The thermal conditions cause the active materials to change properties such as length, size, or shape.

In illustrative embodiments, the active material may be any type of material with super elastic properties configured to change size, shape, or length when exposed to certain thermal conditions. The material may be an alloy of titanium and nickel which may also be called nitinol. In some embodiments the active material may be processed to be a smart material and take on a plurality of predefined sizes, shapes, or lengths at different predefined thermal conditions.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIGS. 1A-1D are a series of views showing an occupant support transitioning from a neutral, or relaxed contour position to a different contoured support position;

DETAILED DESCRIPTION

Figure 9:
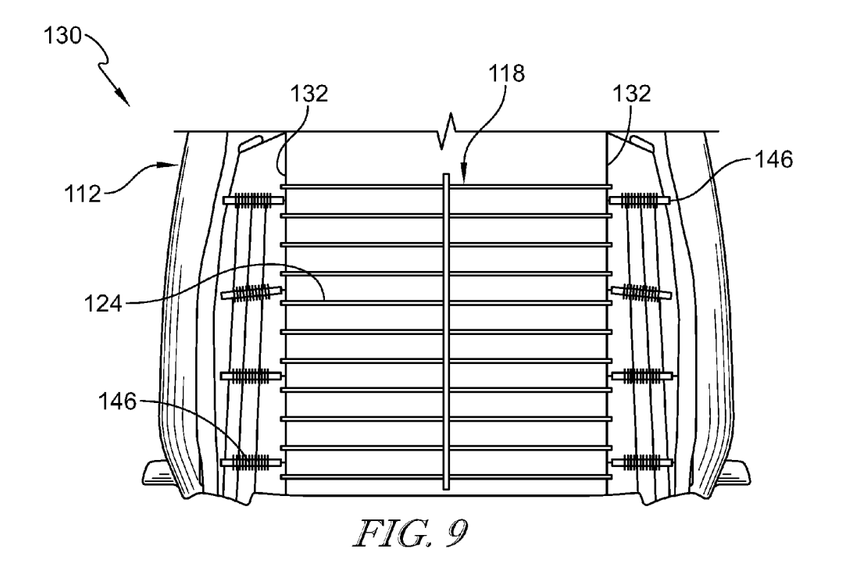
FIG. 9 is a front elevational view of another embodiment of a vehicle seat in which the thermal activation material forms a connector between a suspension mat and a vehicle seat frame.
Figure 10A:
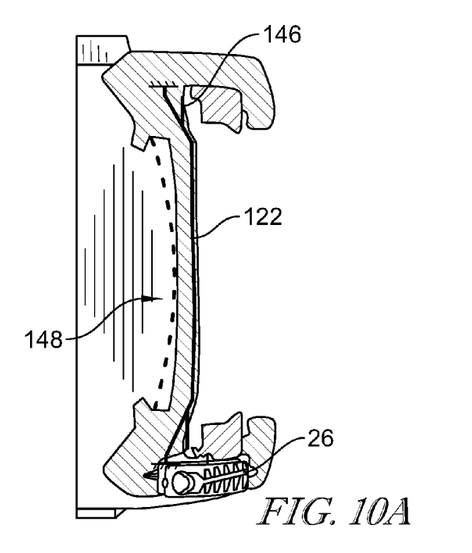
FIG. 10A is a top plan view of the seat back of FIG. 9 showing an exemplary design position.
Figure 10B:
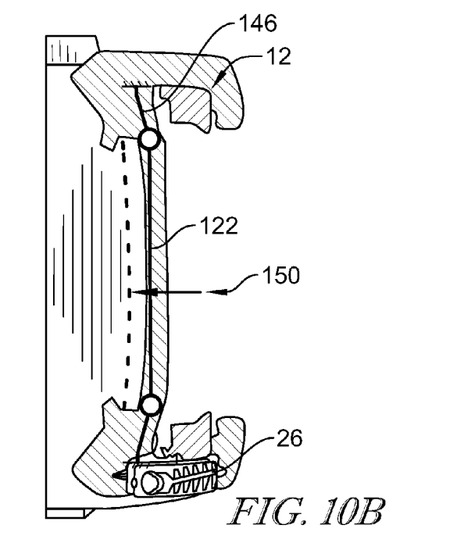
FIG. 10B is a view similar to FIG. 10A showing thermal activation of the seat back of FIGS. 9 and 10A showing the actuated position for the seat back structure.
Figure 11A:
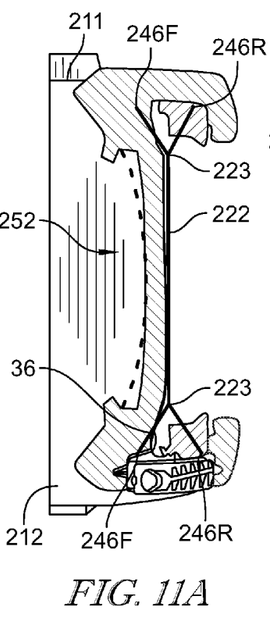
FIG. 11A is a top plan view of another embodiment of a vehicle seat in which a plurality of opposite-acting front and rear wires made of thermal activation material that interconnect to form a suspension mat and a vehicle frame in the design position.
Figure 11B:
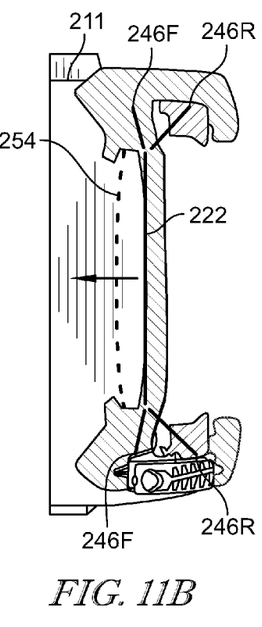
FIG. 11B is a view similar to FIG. 11A in which the forward wires are thermally activated to act against the rearward wires that are not activated to move the support from the design position in a forward direction towards a seat occupant.
Figure 11C:
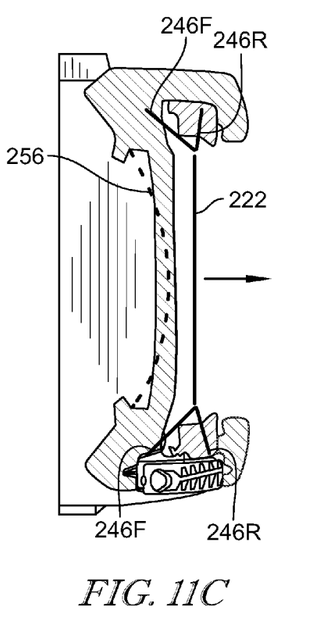
FIG. 11C is a view similar to FIG. 11B in which the rearward wires are thermally activated to act against the forward wires that are not activated to move the support from the design position in a rearward direction away from a seat occupant.
Figure 12A:
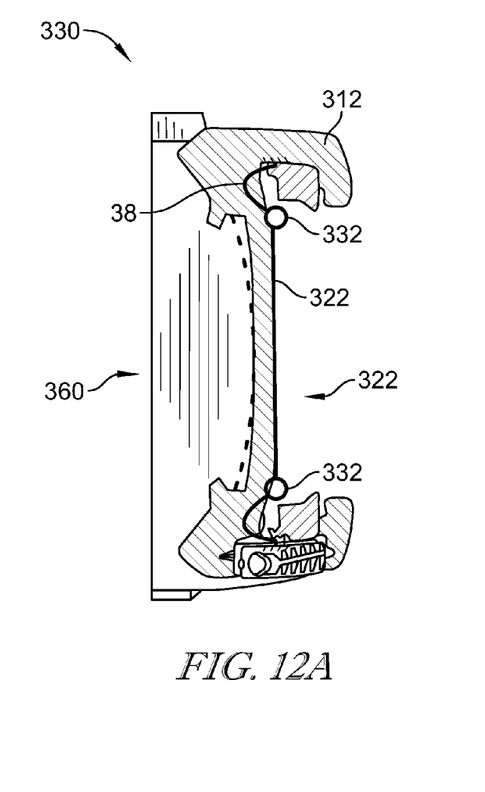
FIG. 12A is a top plan view of another embodiment of a vehicle seat and a plurality of heat-treated U-shaped wires that interconnect to form a suspension mat with a vehicle frame arranged in the design position.
Figure 12B:
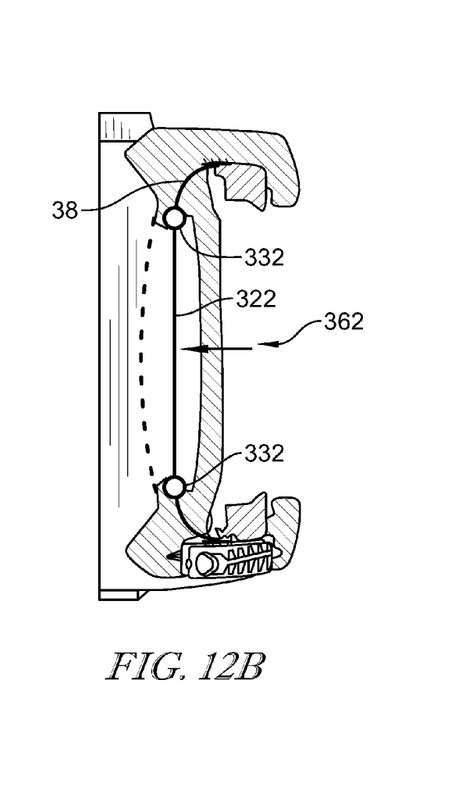
FIG. 12B is a view similar to FIG. 12A showing thermal activation of the seat back of FIG. 12A causing movement to the actuated position for the seat back structure.

A process of transitioning a vehicle-seat support by regulating the temperature of materials in the vehicle seat is shown in FIGS. 1A-1D. A first embodiment of an occupant support that may transition from a design position to another support position, especially in a lumbar region, is shown in FIGS. 2-8. Another embodiment of an occupant support capable of transitioning from a design configuration is shown in FIGS. 9-10B. A third embodiment of an occupant support which may be transitioned from a design position is shown in FIGS. 11A-C. Another embodiment of an occupant support in accordance with the present disclosure is shown in FIGS. 12A-12B.

FIGS. 1A-D are a series of diagrammatic and side views of an exemplary vehicle-seat support transition process where a vehicle-seat support included in a vehicle seat changes in shape to change support to an occupant sitting in the vehicle seat. The vehicle-seat support transition process begins in FIG. 1A at a first point where the vehicle seat may be in a neutral unregulated position. The process proceeds in FIG. 1B to a second point where targeted heating may be applied to portions of the vehicle seat support thereby changing the seat back support contour. The process proceeds in FIG. 1C to a third point where a desired seat back contour has been reached. The process then proceeds to a fourth point where the seat back is locked in the desired second seat back contour and the heating is discontinued.

The transitioning process shown in FIGS. 1A-1D shows a vehicle seat 10 having a seat bottom 11 and a seat back 16 neutrally positioned. In disclosed embodiments the neutral position is relaxed and minimally supportive but may be relatively stiff and maximally supportive. Adjustment of the support provided by the seat back 16 may be implemented by an interface 18, such as a vehicle display interface, dashboard, or even buttons or sensors 17 located on the vehicle seat 10.

Figure 1A:
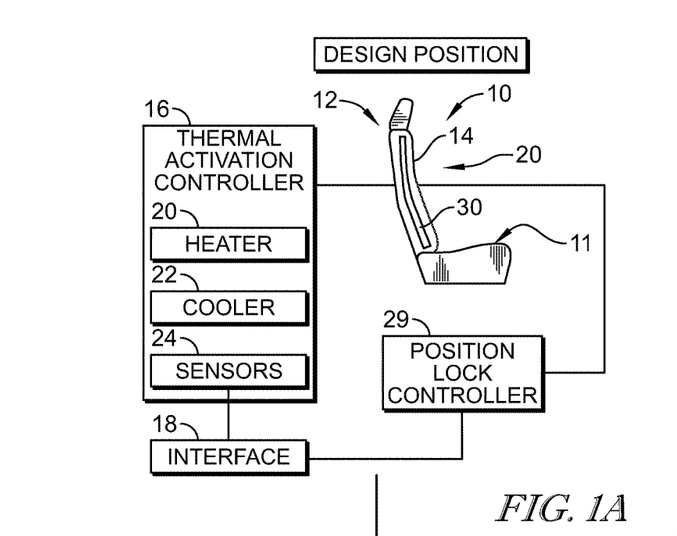
FIG. 1A is a perspective and diagrammatic view of an occupant support in a neutral position having a generally flat seat back prior to thermal activation as the occupant support would exist at typical ambient environmental temperatures.
Figure 1B:
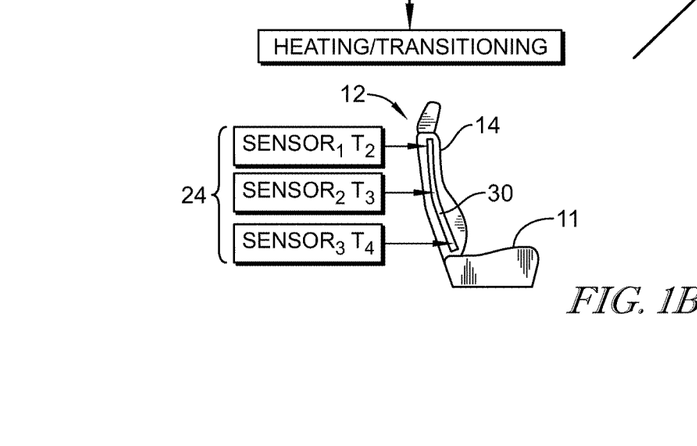
FIG. 1B is a view similar to FIG. 1A showing the occupant support during targeted temperature control in which a first upper portion of a seat back of the occupant support is at a first temperature, a second middle portion of the seat back is at a second temperature, and a third bottom portion of the seat back is at a third temperature and a corresponding changing in the seat back contour that is occurring during the changes in temperature from the environmental temperature.

When a request for a change in the seat contour is detected at the interface 28, thermal activation controller 16 may activate heaters 20 and/or coolers 26 at targeted locations on an occupant support 14 in the seat back 16. As seen in FIG. 1B these changes in temperatures regulated by feedback sensors 17 results in changes of the geometry of the contour of the seat back 16. For example, an upper portion of the seat back 16 at sensor 1 may be maintained at an environmental temperature T2, while a middle portion of the seat back may be heated to temperature T3 and a lower portion of the seat back may be heated to temperature T4.

Figure 1C:
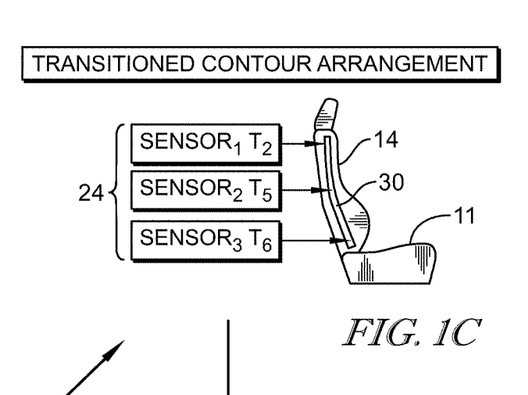
FIG. 1C is a view similar to FIGS. 1A and 1B showing the occupant support at the different contoured support position and the first upper portion of the seat back is at the first temperature, the second middle portion of the seat back is at a fifth temperature, and the third bottom portion of the seat back is at a sixth temperature and a corresponding contoured support position is established.
Figure 1D:
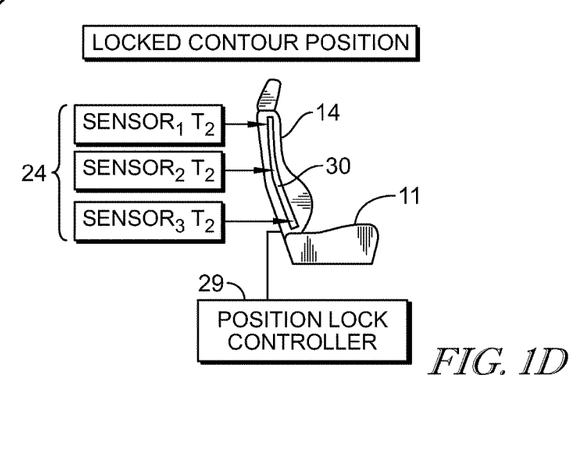
FIG. 1D is a view similar to FIGS. 1A-1C in which a position lock controller included in the occupant support has locked the seat back in the different contoured support position and the thermal activation controller is deactivated so that the temperatures at each of upper, middle, and lower portions revert to an environmental temperature.

Temperatures at each of the sensors 17 may be monitored and temperature modified until a desired transitional arrangement or contour of the seat back 16 is achieved in FIG. 1C. As seen in this configuration, for example, the upper seat back portion was maintained at temperature T2 while the middle portion was increased further to temperature T5 and the lower portion increased even further to temperature T6. Upon reaching the transitioned contour of the seat back, the temperature may be maintained, or the position lock controller 29 may be activated to maintain the occupant support 14 in the contoured position. The position lock controller 29 may be mechanical mechanism such as a ratcheting mechanism, gearing mechanism, or pin, which locks each independently heat adjustable portion of the seat thereby locking the overall contour of the seat back 14 in the second position. The thermal activation controller 16 may then be deactivated and temperatures at sensors 17 may revert to the environmental temperature T2.

Figure 2:
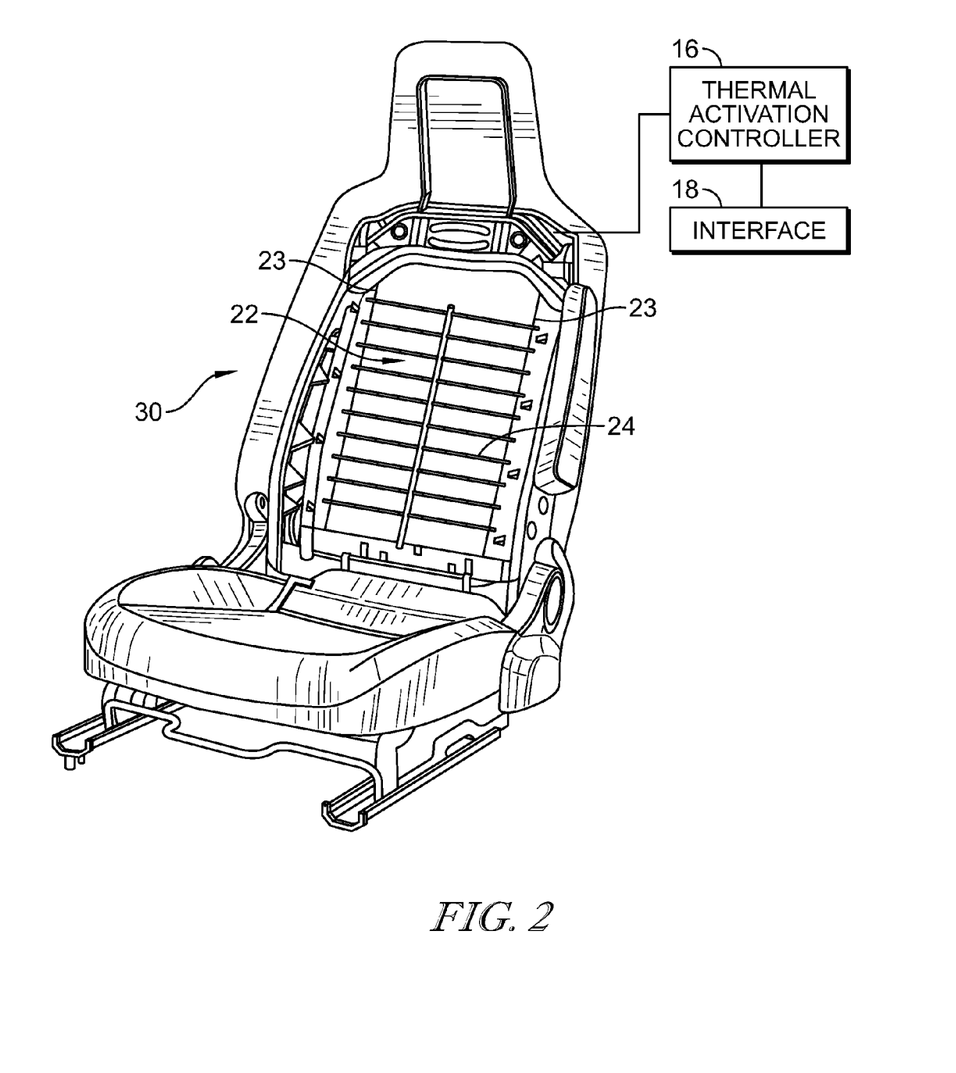
FIG. 2 is a perspective view of an embodiment of a seat back structure according to the back system of FIG. 1.

An occupant support 14 includes vehicle seat 10 and lumbar support system 30 as shown in FIG. 2. Vehicle seat 10 includes a seat bottom and a seat back 16 coupled to the seat bottom to extend upwardly. Lumbar or back support system 30 is coupled seat back 16 and is configured to vary in shape to provide differing levels of support to an occupant. Lumbar support system 30 includes a thermal activation mechanism 16 and a suspension mat 22. Thermal activation mechanism 16 moves heat as needed to and from the suspension mat 22 to cause the changes in support to be achieved.

Suspension mat 22 includes a plurality of wires 24 made of one or more active materials that are configured to change size, shape or length based on thermal activation. In some embodiments, the plurality of wires are made of a shape-memory alloy (SMA) having super elastic properties, such as nitinol. Nitinol may also handle extreme strain, thereby accounting for the variety of weights of vehicle occupants. The wires 24, may be secured fixedly at each end to vertical undeforming rails 23 of the seat back 16. The shape memory effect is the ability of a material to undergo deformation at one temperature and then recover its original un-deformed shape upon heating at certain level, called transformation temperature. The term super elasticity occurs at a narrow temperature range just above its transformation temperature. In this case no heating is necessary to cause un-deformed shape recovery, and the material exhibits enormous elasticity properties. In some embodiments, heat-actuating materials are selected with transformation temperatures outside of the range of typical ambient temperatures, for example, above 150 degrees Fahrenheit.

In some embodiments, the shape memory alloy is a smart shape memory alloy (S-SMA), such as wire manufactured by Smarter Alloys™ of Waterloo, Ontario to use its Multiple Memory Material™. The S-SMA permits multiple positions to be programmed in a single wire 24 at distinct temperatures so that at multiple temperatures the single wire may be driven to a different shape, or tension, thereby driving the corresponding overall contour of the lumbar support as each wire 24 changes between the programmed temperatures. In other words, the S-SMA may also be nitinol that has been processed to have a plurality of transition phases and corresponding transition positions.

While support system 30 is embodied as a lumbar support system 30, it may be included elsewhere in seat back 12, seat bottom 11, or any other suitable location. Thermal activation mechanism 16 includes a heater 20 and a cooler 26 coupled to the occupant support 14. The heater 20 and cooler 26 may comprise a series of transistors controlled by a control board 19. The thermal activation mechanism may further optionally include one or more thermal sensors 17. Input controller 18 may include one or more of a vehicle display interface, console interface, or buttons located on the vehicle seat so that commands input into the input controller 18 may activate the thermal activation mechanism 16.

Input controller, or interface 18, is configured to control thermal activation mechanism 16 so that thermal energy is supplied to the plurality of wires 24 above an activation temperature of the plurality of wires 24, affecting a transformation in the wires 24. Sensors 17 may monitor the temperatures of the wires 24 as part of a feedback loop. The active material of the wires is configured to have two crystal structures defined by austenitic and martensitic phases. In the cold (below activation temperature) martensitic phase, the material is malleable, whereas in the high (above activation temperature) austenitic phase, the material is rigid. The transformation (heating above the activation point, which is unique to the particular composition of active material used) from martensitic to austenite phases creates a significant amount of force in the SMA. It is this transformation force that is used by the actuation mechanism for actuation. Maintaining the temperature above the activation temperature will leave the material in the austenite phase, which is very rigid. Alternatively, quick-cycling between austenitic and martensitic phases by alternating between the heater 20 and the cooler 26 may be used to implement a massaging mode in the occupant support 14. Upon cooling via forced cooler 26 or ambient cooling and cutoff of heater input 20, the material will revert to the martensitic phase.

Figures 3, 4:
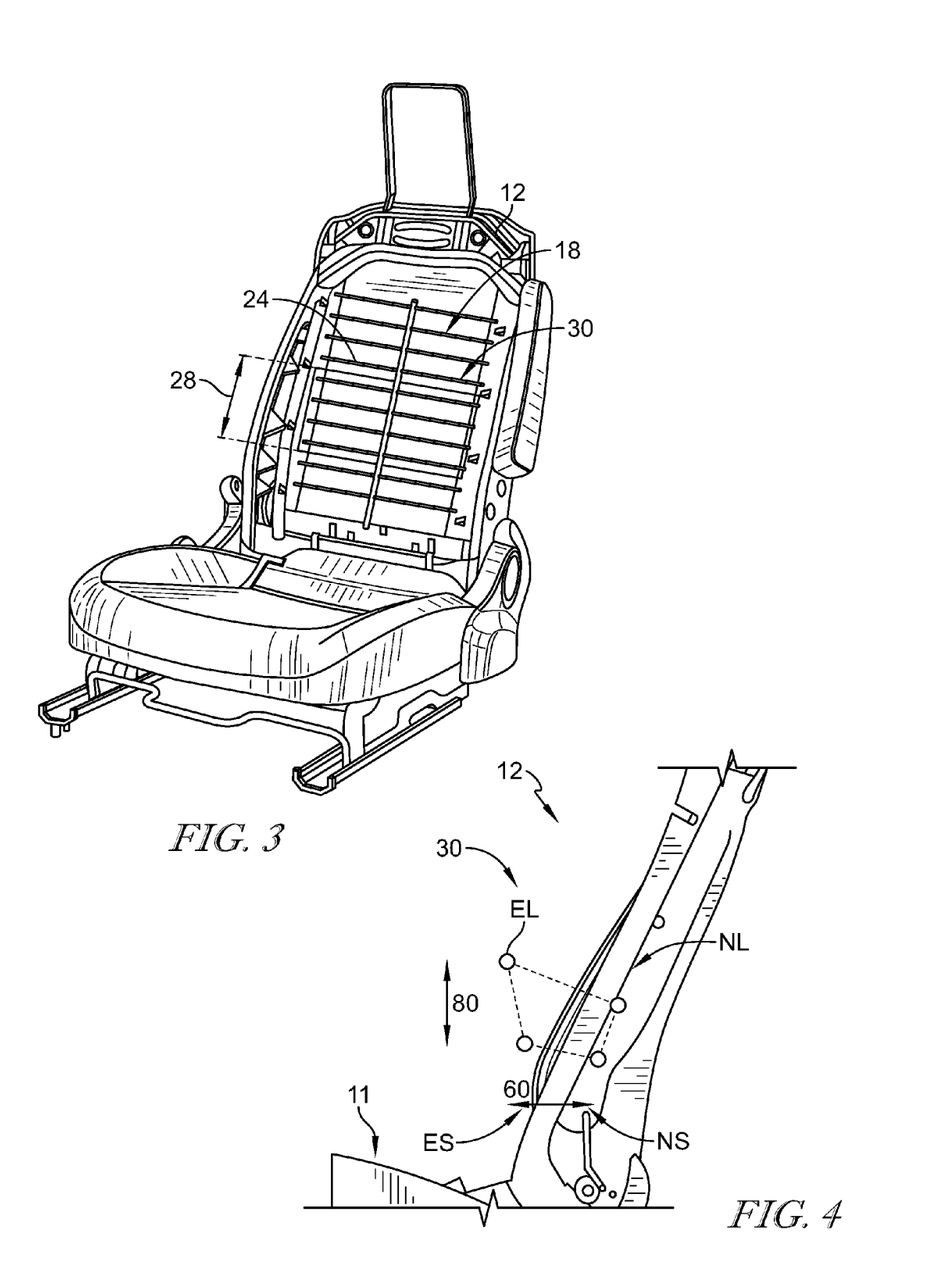
FIG. 3 is a partial perspective view of the lumbar region of the seat back structure of FIG. 2 identifying a lumbar region.
FIG. 4 is a partial elevational view of an exemplary range of motion of the seat back structure in the lumbar region of the seat back of FIG. 3.

More specifically as seen in FIGS. 3-4, the lumbar support system 30 is configured to move the wires 24 to a predetermined shape within a defined lumbar region 29 that may extend approximately 250 millimeters in length up the seat back 12. As further seen, the user interface may be programmed, or store settings for manipulating a person between a neutral position and an erect position based on whether the person is relatively small or large. For example, for a large individual, the support wires 24 may position the person between a NL at the neutral position to EL at the erect position, whereas for a small individual, the support wires may transform to position a person between a NS position and a NE position. As may be seen the lumbar projection is shifted approximately 80 millimeters in the vertical direction to more accurately locate it in the lower back region. The height and projection distances may be pre-set or predefined by passengers and stored in the vehicle for future usage by the passenger.

Figure 5:
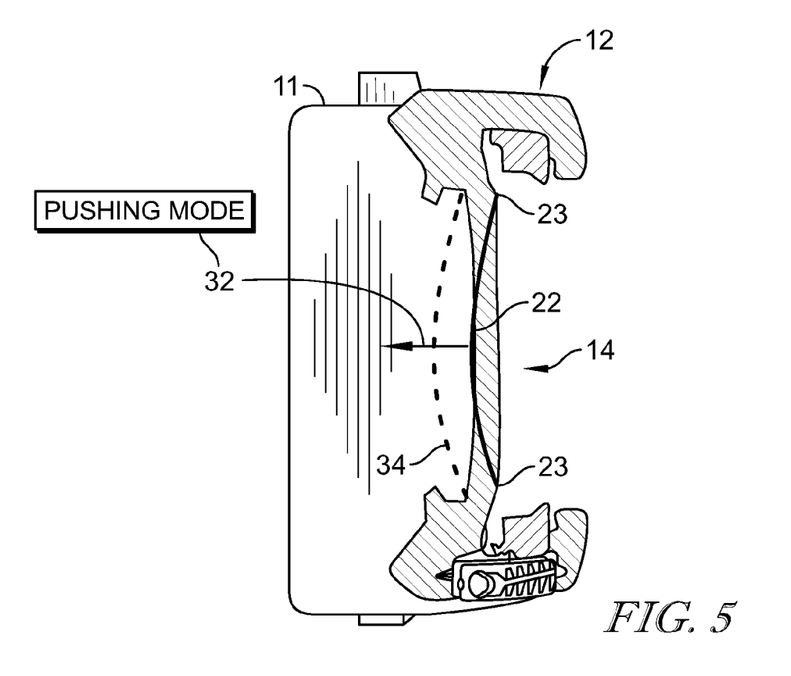
FIG. 5 is a top plan view, with portions removed, showing thermal activation of the seat back according to the lumbar system of FIG. 1 in a pushing mode where thermal activation results in the seat back structure and seat back trim extending outwardly in a forward direction towards the seat bottom.
Figure 6:
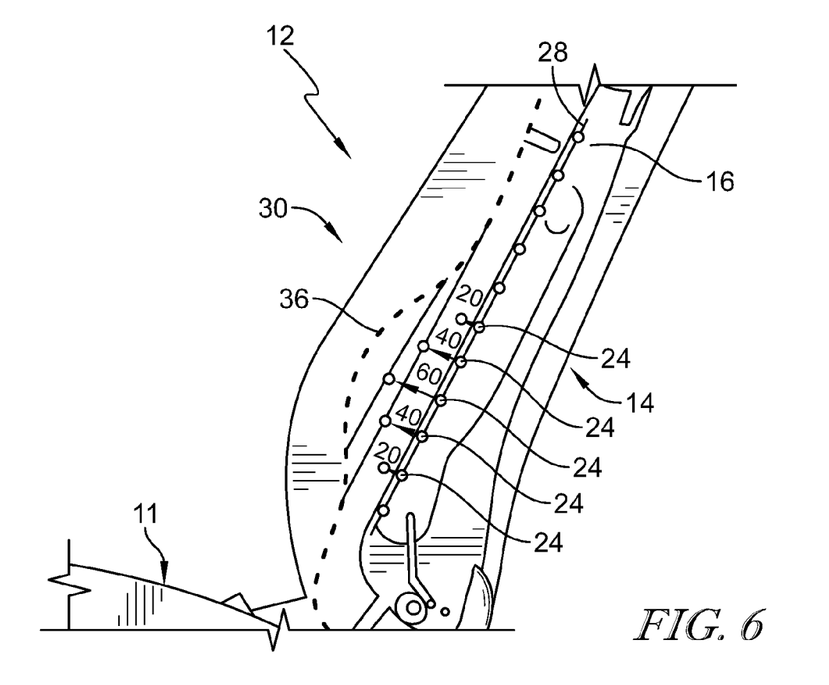
FIG. 6 is an elevational view of the vehicle seat of FIG. 5 showing a design position of the seat back structure and suggesting (in phantom) the outwardly extending actuated position for the seat back structure.

FIG. 5 is an exemplary embodiment of a lumbar support system 30 arranged to transform in a pushing mode 32. As may be seen in the pushing mode the suspension mat 22 moves occupant support 34 from a design position (FIG. 6) towards the region the occupant is supported in, or into the seat bottom to the transformation position of the occupant support 34. As shown in the side view of FIG. 6, each of the plurality of wires 24 may be preconfigured to deform in a particular manner that may be different from an adjacent wire so that the overall contour of the transformation position of the occupant support 34 of the occupant-support forms a curved lumbar support shape 35. Adjacent wires 24 are shown to be bowed out to a transformation position of the occupant support 34 shown in phantom. In the pushing mode 32, the bowing may be achieved by lengthening occurring of the wires 24, while ends of the wires remain fixed at vertical rails 23, resulting in expansion of the suspension mat 22. Alternatively, pushing mode may be implemented by the embodiment shown in FIGS. 9-11.

Figure 7:
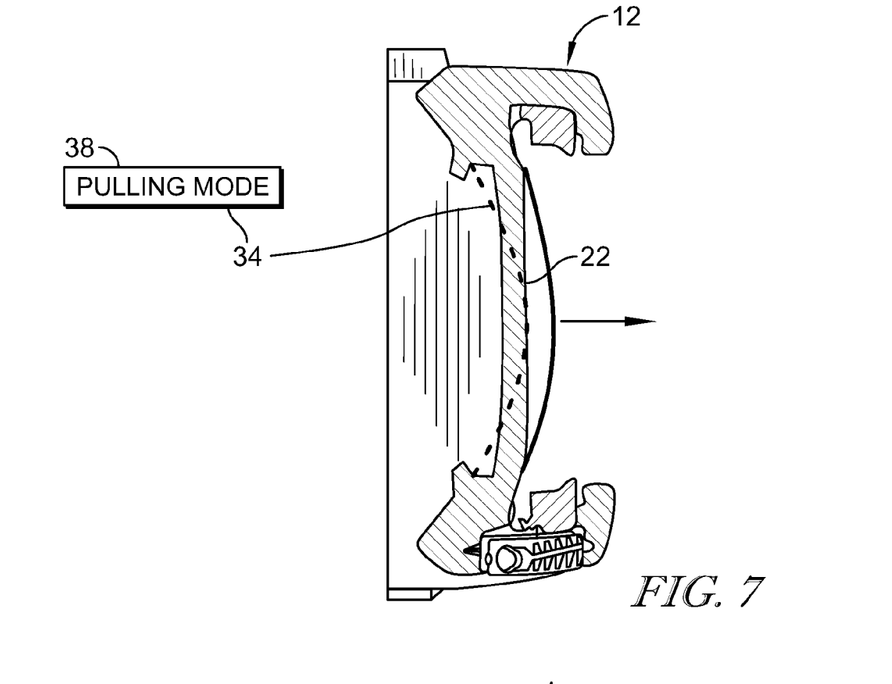
FIG. 7 is a view similar to FIG. 5 showing thermal activation of the seat back according to the lumbar system of FIG. 1 in a pulling mode where thermal activation results in the seat back structure and seat back trim extending in a rearward direction away from the seat bottom.
Figure 8:
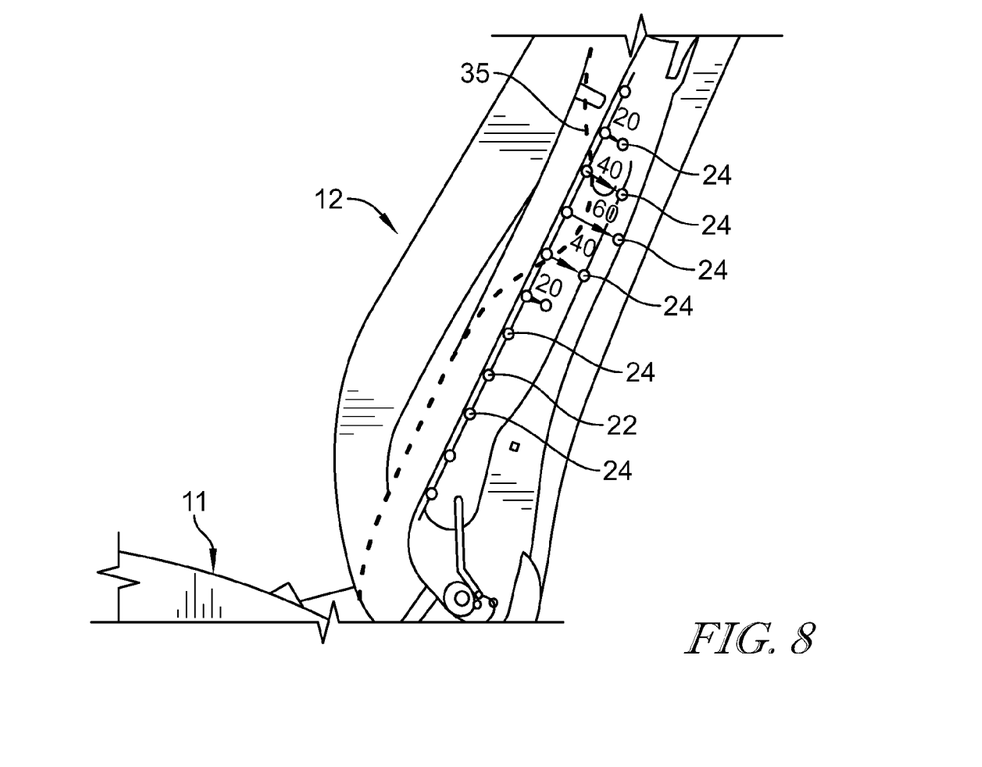
FIG. 8 is a side view partial cross-section of the vehicle seat of FIG. 7 illustrating a design position of the seat back structure and suggesting (in phantom) the rearward extending actuated position for the seat back structure.

FIG. 7 is an exemplary embodiment of a lumbar support system 30 arranged to transform in a pulling mode 38. As may be seen in the pulling mode the occupant support 34 moves from a design position away from the region the occupant is supported in, or the seat bottom to the transformation contour position of the occupant support 34. As shown in the side view of FIG. 7, each of the plurality of wires may be preconfigured to deform in a particular manner that may be different from an adjacent wire so that the overall contour of the transformation position of the occupant support 34 of the occupant-support forms a curved lumbar support shape 35, by recessing the upper portion relative to the lower portion of the suspension mat 22. In the pulling mode 38, the bowing may be achieved by lengthening occurring of the wires 24, while ends of the wires remain fixed relative to vertical rails 23. Alternatively, the pulling mode may be implemented by the embodiment shown in FIGS. 9-11.

According to another embodiment suspension mat 122 of the lumbar support system 130, may include a plurality of non-deforming, or non SMA wires 124 extending longitudinally and coupled to heat-treated, or SMA springs 146 connecting between vertical rails and frame of the seat back 112. Springs 146 may be heat-treated to shorten or lengthen. If default firmness is stiff, a shorter wire may be treated to lengthen upon heating to thereby relax the lumbar support contour. For example, as seen in FIG. 10A, when default firmness is to be relaxed in the design position 148, a longer wire or more relaxed spring 146 may be treated to shorten or contract on heating as seen in FIG. 10B to stiffen the lumbar in the transformation position 150. In this way, different sections of the lumbar support may be firmed or relaxed to create a massage effect. An example may be to stiffen or relax one side before cycling to the other side to create a massage effect. Any other order or number of sections stiffened or relaxed may be used to create multiple types of massage at various rates of oscillation or other movement.

As seen in FIGS. 11A-C, the lumbar support system 230 may comprise a mat, with non-deforming wires as described in FIGS. 9-10. Instead of springs, a plurality of heat treated forward wires 246F and heat treated rear wires 246R extend between and couple vertical rails 232 to frame of seat back 212. Each forward wire 246F is paired with a rear wire 246R to form a V-shape as seen in the cross-sectional top down views. All of the forward wires 246F in this embodiment may receive input from the heater and cooler of the thermal activation mechanism as described in FIG. 1 independent of the rear wires 246R and vice versa.

FIG. 11B shows a forward transition position 254 in which heat may be applied to the forward wires 246F so that they contract and become stiffer and shorter, while cooling may be applied to rear wires 246R so that they remain relaxed. Alternatively, rear wires 246R may remain in their relaxed state due to ambient temperatures without active cooling. As may be seen in this forward transition position 254, the mat 222 is positioned relatively forward of the design position 252 relative to the seat bottom 211.

FIG. 11C shows a rearward transition position 256 in which heat may be applied to the rear wires 246R causing them to contract to become shorter and stiffer, while cooling may be applied to forward wires 246F so that they remain relaxed. As discussed above in 11B, the forward wires 246F may remain in their relaxed state due to ambient temperatures without active cooling. As may be seen in this rearward transitioning position 256, the mat 222 is positioned relatively behind the design position 252 relative to the seat bottom 211. Although this embodiment is described with heat treated wires 246R, 246F treated to shorten with the application of heat, it is also envisioned that the heat treated wires 246R; 246F could be treated to lengthen with the application of heat.

FIGS. 12A-12B show another configuration the lumbar support system 330 may comprise a mat 322, with non-deforming wires 324 as described in FIGS. 9-10. Instead of springs, a plurality of heat treated U-shaped wires 346 extend between and couple vertical rails 332 to frame of seat back 312. In the design position 360, the support 314 may have a very loose or slight lumbar support. The desired shape of the U-shaped wires 346 in the martensitic phase in the design position 360 may be a U shape with one of the straight edges of the U attached to the frame of the seat back 312 and to the other to the vertical rail 332 of the mat 322. When the SMA is activated, the SMA moves to become straighter, causing the U-shaped wire 346 to become a curve having a larger radius of curvature than the design shape. The change in shape of the U-shaped wire 346 forwards is capable of providing greater lumbar support in the transition position 362. Like firmness change described above, any number of wires could likewise be activated and cycled to create a massage effect in the same system.

According to a method of adjusting the lumbar support or providing a massage function to a vehicle seat, a seat is provided with a mat having components made of heat-treated wires. The heat treated wires may be in the seat back, the seat bottom, or both the seat back and the seat bottom. Upon user input, one of lumbar support mode or massage mode is activated. In the massage mode, the heat-treated wires are cyclically heated and cooled between below martensitic and above austenitic temperatures to result in a predetermined repeated pattern of shape changing along the vehicle seat. This massage mode may be continued until further user input to shut off or a request to change the pattern of the cyclic activation to a new pattern is input to vary type of massage at various rates of oscillation.

Wires described above in all of the embodiments may take on a plurality of different formats such as plates, tubes, or sheets partially or fully made from a heat-actuatable material as described above. Any other material that includes suitable properties may be used to accomplish the same task, such as electroactive polymers of any material composition activated in any suitable available.

As shown in the Figs., interfaces, actuation mechanisms and controllers may be embodied one or more additional electronic control units, embedded controllers, processors, engine computers, or other programmable computing devices used to control various vehicle functions.

The invention claimed is:

1. An occupant-support comprising
a vehicle seat including a seat bottom and a seat back coupled to the seat bottom and arranged to extend upwardly away from the seat bottom to provide an occupant-support region, and
a back support coupled to the seat back to move relative to the seat back between a first design position and a second contour position,
wherein the back support includes a plurality of wires that define a contour of the back support and are movable to cause the back support to assume one of the first position and the second position and a temperature controller coupled to the plurality of wires and configured to cause the wires to change in length as temperature changes such that the back support is in the first design position when the wires are at a first temperature and the back support is in the second contour position when the wires are at a second temperature greater than the first temperature to change the back support between the first design position and the second different contour position.

2. The occupant-support of claim 1, wherein the temperature controller comprises a thermal activation mechanism that has a heater and cooler for controlling the temperature of the plurality of the wires.

3. The occupant-support of claim 2, wherein the plurality of wires are formed of a smart-shape memory alloy (S-SMA).

4. The occupant-support of claim 2, wherein each of the plurality of wires is individually controlled by the thermal activation mechanism so that the thermal activation mechanism sends individually determined amounts of heat or cold to each of the plurality of wires.

5. The vehicle seat of claim 1, wherein the plurality of wires are configured to extend further into the occupant-support region in the second contour position in an arcuate shape relative to the design position in a pushing mode.

6. The vehicle seat of claim 1, wherein the plurality of wires are configured to extend further out of the occupant-support region relative to the design position in an arcuate shape in a pulling mode.

7. The vehicle seat of claim 1, wherein the plurality of wires are formed of a shape memory alloy and are attached at a first end to a seat back frame of the vehicle seat and a second end to vertical rails of a suspension mat.

8. A vehicle seat comprising
a seat back coupled to a seat bottom defining an occupant-support region,
a plurality of wires located in the seat back and operable to change the back support between a design position and a transformation position, and
a heating and cooling mechanism that adjusts and maintains temperatures of the plurality of wires to drive the change between the design contour position and the transformation contour position, and
a suspension mat coupled to the seat back frame to support an occupant, wherein the plurality of wires are formed in sets of forward and rearward connectors extending between a seat back frame and the suspension mat.

9. The vehicle seat of claim 8, wherein the plurality of wires extend horizontally between vertical rails forming a suspension mat and the suspension mat is coupled to the seat back frame.

10. The vehicle seat of claim 9, wherein the plurality of wires are formed of a shape memory alloy material and the plurality of wires change to the transformation position in their austenitic phase.

11. The vehicle seat of claim 8, further comprising a suspension mat coupled to the seat back frame to support an occupant, wherein the plurality of wires are formed in coils that extend between and connect the seat back frame the suspension mat.

12. The vehicle seat of claim 11, wherein the coils are formed of shape memory alloy (SMA) material.

13. The vehicle seat of claim 11, wherein the coils are configured to have a relatively greater tension in the transformation contour position then in the design contour position.

14. The vehicle seat of claim 8, wherein sets of forward and rearward connectors are formed of shape memory alloy (SMA) material.

15. The vehicle seat of claim 8, wherein each forward connector forms a V-shape with the rearward connector, and wherein the forward connectors are operably controlled to move to the transformation position while the rearward connectors are maintained in the design position, and the rearward connectors are operably controlled to transform to the transformation position while the forward connectors are maintained in the design position.

\* \* \* \* \*